(12) United States Patent
Funakubo

(10) Patent No.: US 10,351,322 B2
(45) Date of Patent: Jul. 16, 2019

(54) AERATOR DEVICE AND UV PROTECTING COVER MEMBER THEREFOR

(71) Applicant: AQUACONSULT ANLAGENBAU GMBH, Traiskirchen (AT)

(72) Inventor: Noboru Funakubo, Traiskirchen (AT)

(73) Assignee: AQUACONSULT ANLAGENBAU GMBH, Traiskirchen (AT)

( * ) Notice: Subject to any disclaimer, the term of this patent is extended or adjusted under 35 U.S.C. 154(b) by 194 days.

(21) Appl. No.: 14/913,524

(22) PCT Filed: Aug. 19, 2014

(86) PCT No.: PCT/EP2014/067645
§ 371 (c)(1),
(2) Date: Feb. 22, 2016

(87) PCT Pub. No.: WO2015/024928
PCT Pub. Date: Feb. 26, 2015

(65) Prior Publication Data
US 2016/0199793 A1 Jul. 14, 2016

Related U.S. Application Data

(60) Provisional application No. 61/868,840, filed on Aug. 22, 2013.

(51) Int. Cl.
*B65D 65/20* (2006.01)
*B01F 15/00* (2006.01)
(Continued)

(52) U.S. Cl.
CPC .......... *B65D 65/20* (2013.01); *B01F 3/04269* (2013.01); *B01F 15/00779* (2013.01);
(Continued)

(58) Field of Classification Search
CPC ........ B65D 65/20; B65D 65/42; B65D 65/00; B65D 29/02; B65D 2585/6897;
(Continued)

(56) References Cited

U.S. PATENT DOCUMENTS 5,294,469 A    3/1994  Suzuki et al.
5,994,242 A *  11/1999 Arthurs ................... B32B 27/12
                                                 442/102
(Continued)

FOREIGN PATENT DOCUMENTS

FR    2 800 715 A1   5/2001
GB    1 199 623 A    7/1970
(Continued)

OTHER PUBLICATIONS

Jaeger Group of Companies "Disc Diffuser Assembly, Operating and Maintenance Instruction" published Jul. 2007 (Year: 2007).*
(Continued)

*Primary Examiner* — Stephen Hobson
(74) *Attorney, Agent, or Firm* — Ladas & Parry LLP

(57) ABSTRACT

Aerator device for introducing gas bubbles into a liquid and comprising a base member with a gas supply and an elastic perforated membrane attached to the base member, and further with a UV protecting cover member, said UV protecting cover member or at least a part thereof being arranged above the membrane to protect the membrane against UV radiation during shipping and storage.

13 Claims, 3 Drawing Sheets

(51) Int. Cl.
*B32B 27/40* (2006.01)
*B32B 3/26* (2006.01)
*B65D 65/42* (2006.01)
*B32B 5/02* (2006.01)
*B32B 5/24* (2006.01)
*B32B 7/12* (2006.01)
*B32B 27/06* (2006.01)
*B01F 3/04* (2006.01)
*B65D 30/08* (2006.01)
*B65D 65/00* (2006.01)

(52) U.S. Cl.
CPC .............. *B32B 3/266* (2013.01); *B32B 5/024* (2013.01); *B32B 5/24* (2013.01); *B32B 7/12* (2013.01); *B32B 27/06* (2013.01); *B32B 27/40* (2013.01); *B65D 65/42* (2013.01); *B01F 2003/04432* (2013.01); *B32B 2255/02* (2013.01); *B32B 2255/10* (2013.01); *B32B 2255/26* (2013.01); *B32B 2262/0261* (2013.01); *B32B 2307/414* (2013.01); *B32B 2307/71* (2013.01); *B32B 2553/00* (2013.01); *B65D 29/02* (2013.01); *B65D 65/00* (2013.01); *B65D 2313/08* (2013.01); *B65D 2585/6897* (2013.01)

(58) Field of Classification Search
CPC ........... B65D 2313/08; B01F 15/00779; B01F 3/04269; B01F 2003/04432; B32B 27/06; B32B 7/12; B32B 5/24; B32B 5/024; B32B 3/266; B32B 27/40; B32B 2553/00; B32B 2255/02; B32B 2262/0261; B32B 2307/71; B32B 2307/414; B32B 2255/26; B32B 2255/10
See application file for complete search history.

(56) References Cited

U.S. PATENT DOCUMENTS

| | | | |
|---|---|---|---|
| 6,344,147 | B1 | 2/2002 | Meyer |
| 6,406,005 | B1 | 6/2002 | Lawson et al. |
| 6,586,080 | B1* | 7/2003 | Heifetz ............... B29C 63/0017 428/198 |
| 7,255,333 | B2* | 8/2007 | Casper ................. B01F 3/0412 261/122.1 |
| 8,132,794 | B2* | 3/2012 | Hinde ................ B01F 3/04113 261/105 |
| 2003/0049986 | A1* | 3/2003 | Qureshi .................... B32B 5/02 442/221 |
| 2005/0170720 | A1* | 8/2005 | Christiansen ........ A01G 9/1438 442/1 |
| 2013/0139744 | A1* | 6/2013 | Le Buzit ............... B63B 59/045 114/361 |
| 2015/0183194 | A1* | 7/2015 | Lehmann ............... B32B 27/12 442/202 |

FOREIGN PATENT DOCUMENTS

| | | |
|---|---|---|
| WO | 2009/132374 A2 | 11/2009 |
| WO | 2010/075946 A1 | 7/2010 |
| WO | 2012/141723 A2 | 10/2012 |

OTHER PUBLICATIONS

"Double-sided tape" Wikipedia published Jun. 29, 2012 (Year: 2012).*
Wikipedia's "Transparency and translucency" (Year: 2018).*
Saeed et al. "Optical properties of poly vinyl chloride/polystyrene blends" published May 2014 (Year: 2014).*
Technik "Tube Diffuser Assembly, Operating and Maintenance Instruction" published Jul. 2007 (Year: 2007).*

\* cited by examiner

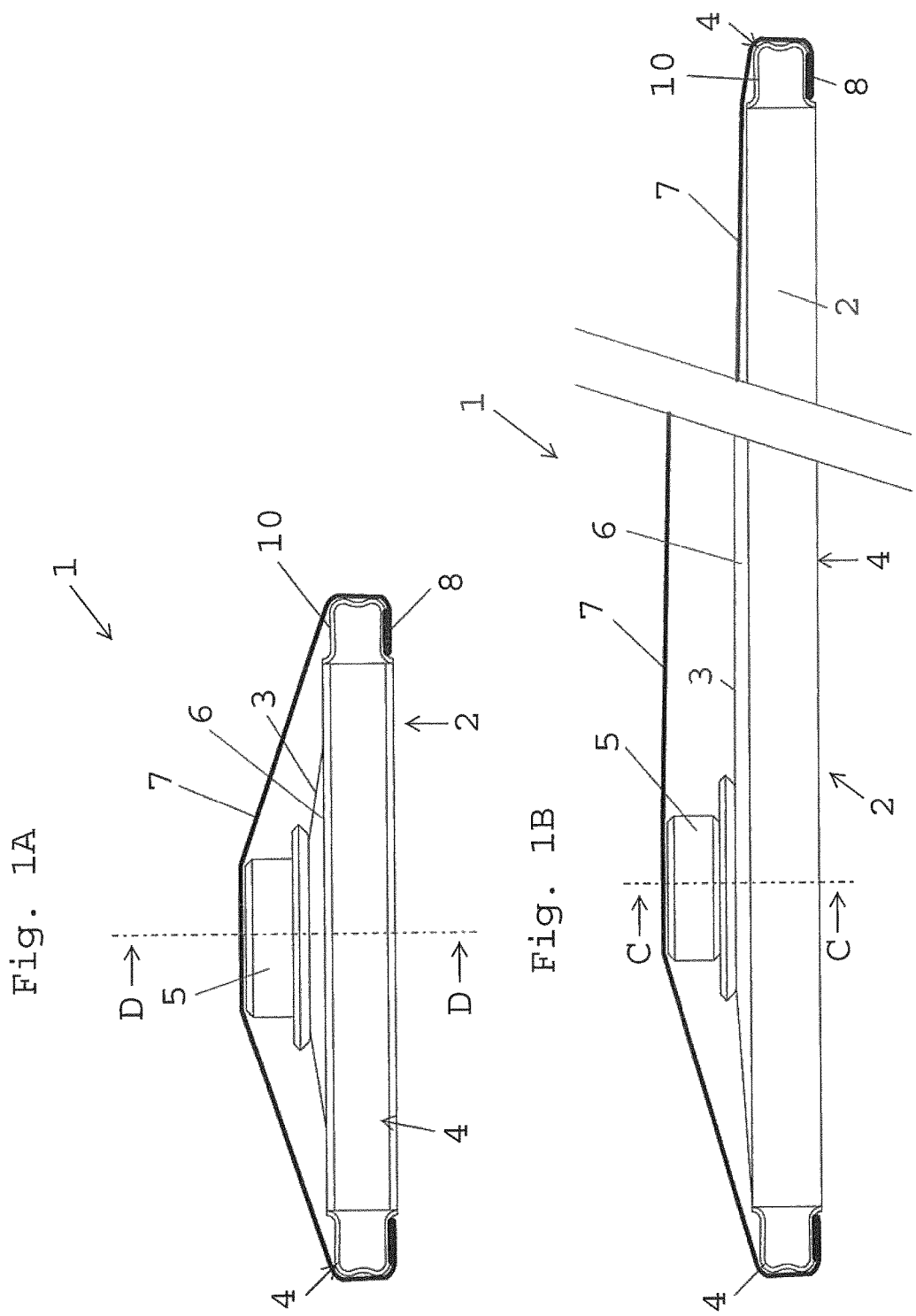

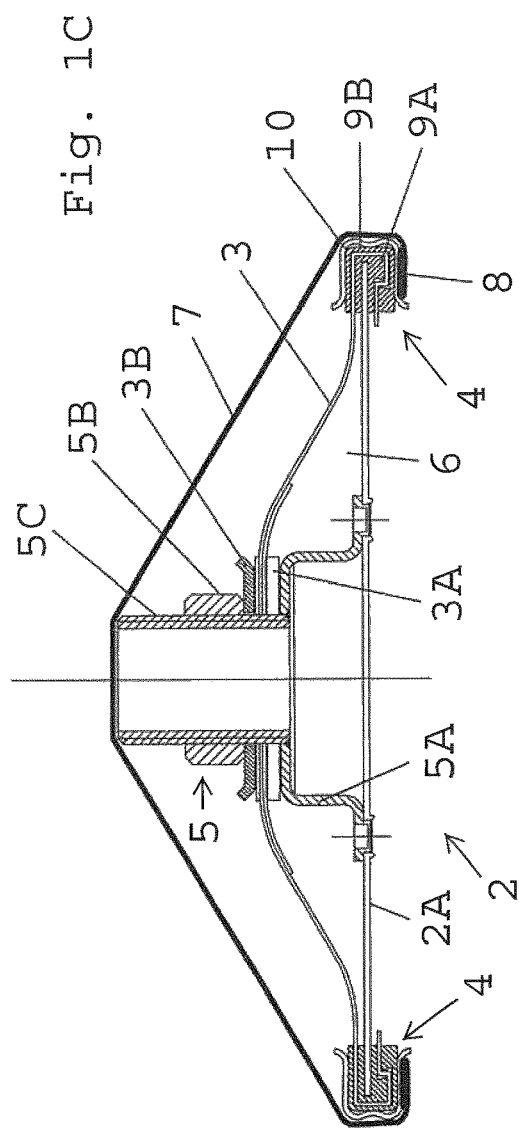
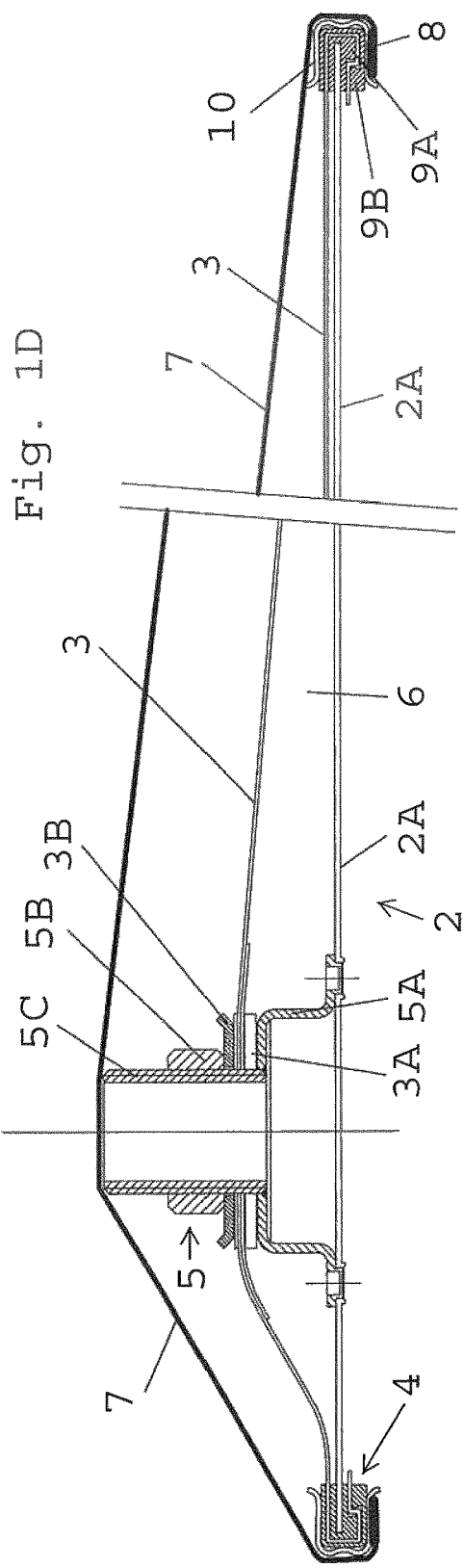

AERATOR DEVICE AND UV PROTECTING COVER MEMBER THEREFOR

CROSS-REFERENCE TO RELATED APPLICATION

This U.S. application claims priority under 35 U.S.C 371 to, and is a U.S. National Phase application of, the international Patent Application No. PCT/EP2014/067645, filed 19 Aug. 2014 which claims priority from U.S. Provisional Application No. 61/868,840 filed on 22 Aug. 2013, the disclosures of which is incorporated in their entirety by reference herein.

FIELD OF INVENTION

The present invention relates to an aerator device for introducing gas bubbles into a liquid, such an aerator device comprising a base member with a gas supply and an elastic perforated membrane attached to the base member.

The invention also refers to a UV protecting cover member which may be used to protect the perforated membrane of an aerator device against UV radiation during shipping and storage in free areas.

BACKGROUND ART

Aerator devices, in particular strip-like aerator devices, also called strip diffusers, are known in various embodiments in the art, cf. for instance WO 2009/132374 A2, U.S. Pat. No. 7,255,333 B2, U.S. Pat. No. 6,406,005 B1, and U.S. Pat. No. 6,344,147 B1. Such aerator devices are used in aerating waste water in activated sludge plants. During use, gas, in particular air, is supplied to the space between the base member and the perforated membrane attached to the base member; in most embodiments, the perforated elastic membrane is bulged upwardly, and gas or air passes through the perforations in the membrane upwardly into the waste water in form of gas bubbles. As already mentioned, these structures and functions are well known in the art so that no further description is needed here.

Usually, the perforated elastic membrane is made of polyurethane (PU) which may be adversely affected by UV radiation. When aerator devices or strip diffusers as mentioned above are produced and delivered, they are often stored in free areas so that the PU membrane is exposed to sunshine comprising the adverse UV radiation. Therefore, the perforated PU membranes may be deteriorated so that, when finally installed, the function of the perforated PU membrane is reduced and the term of operation is shortened.

SUMMARY OF INVENTION

Accordingly, it is an object of this invention to avoid these disadvantages, i.e. the adverse influence of UV radiation to the perforated PU membranes or the like of aerator devices.

Further, it is an object to provide for means to protect perforated membranes of assembled aerator devices before being installed.

It is a further object of the invention to provide a protective member for the perforated membranes which provides sufficient UV filtering on the one hand and sufficient strength on the other hand so that it may withstand stresses when manipulating the assembled aerator devices during shipping and storing.

Accordingly, the present invention provides an aerator device as mentioned above which further comprises a UV protecting cover member which is arranged at least in part above the perforated membrane of the aerator device, to protect the perforated membrane against UV radiation during shipping and storage.

According to another aspect, the invention provides a corresponding UV protecting member adapted to protect a perforated membrane of an aerator device.

The UV protecting cover member may include at least one UV filtering substance, or may be completely made of a UV filtering material. To obtain a light-weight protecting member which furthermore renders easy handling possible, the UV protecting cover member comprises a flexible sheet material rather than a rigid hood-shaped cover member. This flexible sheet material may comprise a composite sheet, in particular such one which comprises a woven fabric as carrier layer for sufficient strength. This woven fabric in use is arranged in a position facing the perforated membrane, here also called the lower layer of the sheet material.

On the other side, the composite sheet comprises a polyurethane (PU) film which provides for UV radiation filtering. To this end, the PU film may contain UV filtering substances, for instance as mentioned below. For protection purposes, this polyurethane film may be coated with translucent polyvenyl chloride (PVC).

The UV protecting cover member may have a very low weight, and may have a thickness of only 0.3 to 0.6 mm.

When installed, it is to be preferred that the UV protecting cover member is releasably or removably arranged, in particular attached to the base member of the aerator device, possibly with an interposed perforated membrane part. Otherwise, it would also be possible to fixedly attach the UV protecting cover member to the base member of the aerator device, and to remove this cover member when installing the aerator device in a respective waste water basin by cutting it so that at least the part of the protecting cover member which covers the perforated membrane may be removed.

The flexible sheet material of the present UV protecting cover member may be formed to a tube-like member which is pulled over the length of the strip-like aerator device, to provide for protection of the perforated elastic membrane thereof.

In a preferred embodiment, the UV protecting cover member, in particular the flexible sheet material thereof, is releasably attached to the base member and/or the membrane by fixing means so that the cover member may have a simple form of a plane film or sheet which is fixed to the aerator device.

As fixing means, adhesive means may be used. In particular, it is preferred to provide a double-sided adhesive tape to adhesively fix the flexible sheet material to the base member of the respective aerator device, possibly with interposition of the membrane between the base member and the UV protecting sheet material.

BRIEF DESCRIPTION OF THE DRAWINGS

The invention will now be described in more detail by way of preferred exemplary embodiments and with reference to the drawings.

FIG. 1, in its parts FIG. 1A (front view), FIG. 1B (side view), FIG. 1C (cross-section C-C, as indicated in FIG. 1B) and FIG. 1D (longitudinal cross-section, according to line D-D in FIG. 1A) schematically shows a so-called T-type strip aerator device with an installed UV protecting cover member in form of a composite flexible sheet material covering the upper side of the strip-like aerator device and thus protecting the perforated membrane thereof against UV radiation.

DESCRIPTION OF THE PREFERRED EMBODIMENTS

Figure 2B:
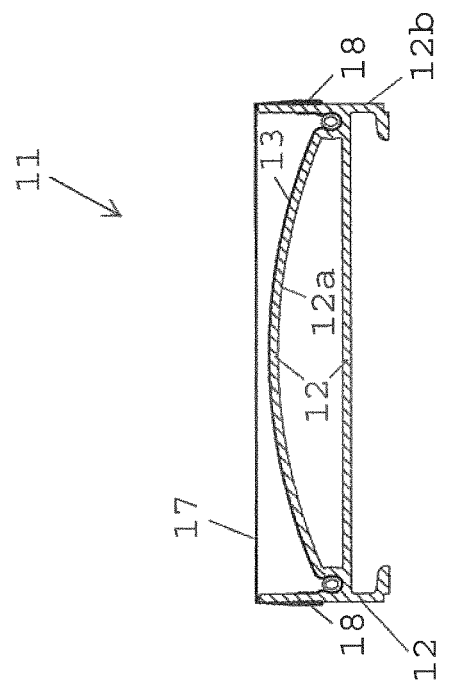
FIG. 2 shows, in its three parts FIG. 2A (front view), FIG. 2B (cross section) and FIG. 2C (side view), a somewhat modified aerator device, a so-called Q-type aerator, again with an attached UV radiation protecting member in form of a flexible sheet material.

FIG. 1 shows a so-called T-type strip-like aerator device 1 in a front view (FIG. 1A), in a side view showing a longitudinal side of this aerator device 1 (FIG. 1B), and in cross-sections C-C (FIG. 1C) and D-D (FIG. 1D). This strip-like aerator device or diffuser 1 generally comprises a base member 2 to which, in a usual manner, a perforated elastic membrane 3, in particular a PU membrane 3, is attached, as usual at peripherally extending border strips 4.

Gas supply means 5 are connected to the perforated membrane 3 in tight manner, and to this gas supply means 5 a gas supply tube or the like may be connected from above when installing the aerator device in a waste water basin of a flotation plant, as is known in the art. Thus, by this supply means 5, gas, in particular air, may be supplied to a space 6 between the base member 2 (specifically base plate 2A) in the perforated membrane 3. Accordingly, the gas or air may then be introduced into a liquid above the aerator device 1 (not shown) through perforations (not shown) in the perforated membrane 3 in the form of bubbles, as is well known in the art.

More in detail, with specific reference to FIGS. 1C and 1D, an inverted cup-shaped base part 5A is tightly fixed to a base plate 2A, which for instance is made from stainless steel. Above this base part 5A, the perforated membrane 3 extends between two washer parts 3A, 3B and beneath a nut member 5B which is screwed onto a socket 5C which has an external thread under which the nut 5B is screwed.

In an alternative, the base plate 2 may be comprised of relatively rigid plastic material; the flexible perforated membrane 3 may be a PU membrane 3.

To protect the perforated membrane 3 from UV radiation, in particular during storing such aerator device 1 in free areas where the aerator device 1 is exposed to solar radiation, a UV radiation protecting cover member 7 is attached to the aerator device 1, as may be seen from FIGS. 1A and 1B. In the shown embodiment, this UV protecting cover member 7 is in the form of a foil-type or film-type flexible sheet material 7 which covers the upper side of the aerator device 1 and thus the membrane 3, and is, with its edge portions, folded around the strips 4 along the edges of the base member 2, with interposition of the membrane 3, and is fixed to the bottom side of said strips 4 by fixing means 8. In particular, these fixing means can consist of pressure-sensitive adhesive or, in particular, of a double-sided adhesive tape. Accordingly, it is possible to easily and quickly remove the flexible sheet material 7 when it is intended to finally install the aerator device 1 in a basin. Before that time, however, the flexible UV protecting sheet material 7 protects the membrane 3 against adverse UV radiation, for instance during storage in a free area.

As to the fixation of the membrane 3 at the border strip arrangement 4, it may be seen in detail from FIG. 1C and FIG. 1D that an inner peripheral strip 9A (which is fixed to the base plate 2A) and an outer peripheral strip 9B are provided; this peripheral strips 9A, 9B may be made from PVC. Between these peripheral strips 9A, 9B, the perforated elastic membrane 3 is arranged, and at the exterior of peripheral strip 9B, a metallic spring-like clamping strip 10 is provided to fix the whole strip arrangement 4. Such arrangements 4 are provided on each of the four sides of the aerator device 1.

Figure 2A:
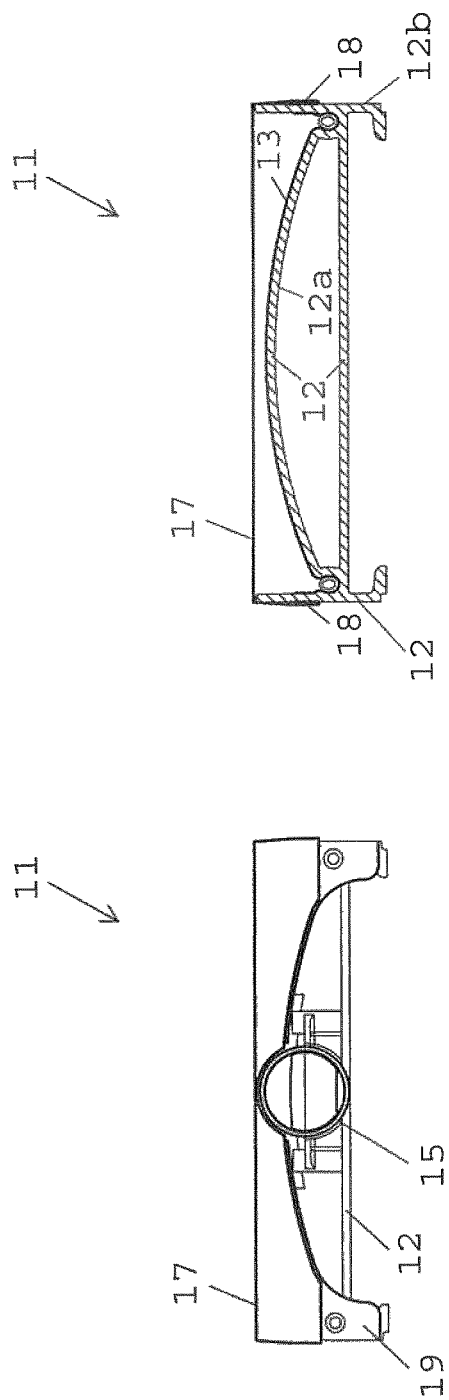
Figure 2C:
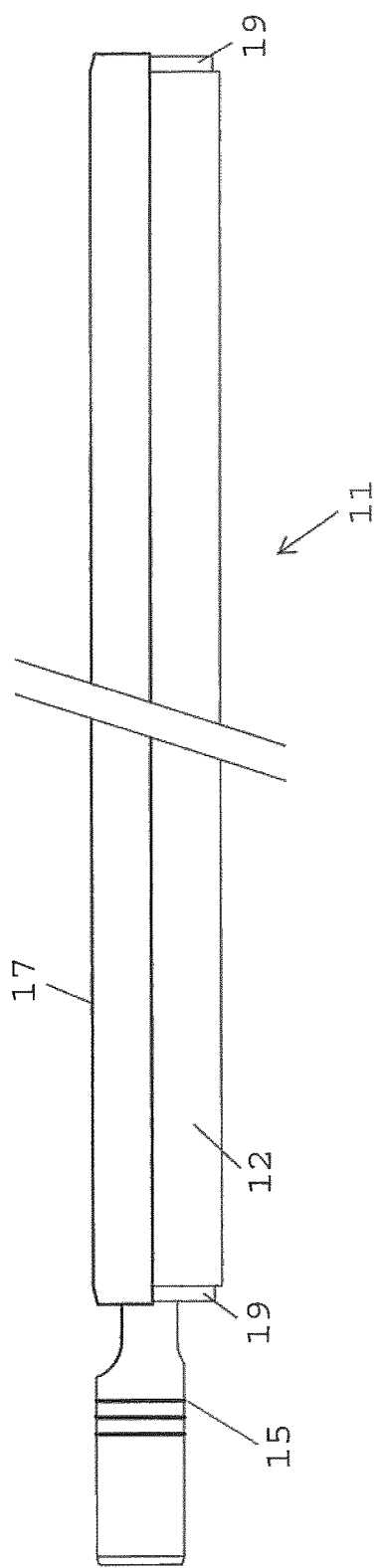

In FIG. 2, more in detail in FIGS. 2A, 2B and 2C, another embodiment of an aerator device 11 is shown which is also called "Q-type strip aerator". This aerator device 11 again includes an elongated, strip-like base member 12 which in this embodiment is an extruded plastics section with an upper, curved plate member 12a against which an elastic perforated PU membrane 13 rests in the inoperative state as shown. During operation, when gas is supplied to the space between the membrane 13 and the basis plate member 12a, the membrane 13 is urged upwardly (not shown) so that gas (air) can pass through the perforations in the membrane 13 in the form of bubbles moving upwardly in the liquid body. From FIGS. 2A and 2C, a gas supply 15 at one front end of the strip-like aerator device 11 may be seen. To this gas supply 15, a tube or the like may be coupled to supply the gas to the aerator 11. Again, this is known in the art and needs no further description.

The section-shaped base member 12 has two lateral web parts 12b, the upper portions of which define a groove adjacent the upper side of the plate 12a in which the membrane 13 is clamped by means of hollow clamping members having an oval cross-section shape (not further referred to in FIG. 2B).

Above the perforated membrane 13, again a UV protecting cover member 17 in form of a sheet material 17 is arranged. Again, the lateral portions of this cover sheet material 17 are folded down at the outside of the web or flange portions 12b of the base member 12, and there are fixing means 18 in form for instance of a two-sided adhesive tape, to releasably stick or fix the edge portions of the sheet material 17 to this web portions 12b of the base member 12.

A similar fixing of the sheet material 17 may be provided at both front ends, cf. for instance FIG. 2A.

In particular, it may be seen from FIGS. 2A and 2C that front clamps 19 are provided there, and the front part of the sheet material 17 is adhesively fixed to this front clamps 19, thereby leaving free the gas supply 15.

In both embodiments, the UV protecting cover member or sheet material 17 may comprise a composite sheet with an inner or lower woven fabric and an outer plastics material, namely a polyurethane film, which may be coated with translucent PVC. The sheet material 17 can have a total thickness of 0.3 to 0.6 mm, and it can comprise one or more UV filtering substances.

As mentioned, a two-sided adhesive tape may be used, but it would of course also be possible to use a pressure-sensitive adhesive, or a viscous adhesive. Such an adhesive or an adhesive tape, as mentioned before, may be applied to the respective parts of the aerator device before applying the protective cover member 17, namely to the stainless steel strips 4 in the embodiment of FIG. 1, or to the web portions 12b and front clamps 19 in the case of the embodiment according to FIG. 2. Thereafter, the sheet material 17 is put onto the upper side of the respective aerator device 1 or 11, and its edge portions are folded down and pressed against the adhesive fixing means 8, 18, i.e. the adhesive or the adhesive tape.

The double-sided adhesive tape may comprise a strong, tear-proof textile carrier which is flexible and which is coated on both sides with a caoutchouc adhesive mass.

The UV protecting cover member sheet material 7, 17 can comprise a woven fabric of polyamide 6 fibres, for instance with a tensible strength of 850 N warp and at least 700 N weft. This polyamide 6 fabric is coated at the upper (outer) side with polyurethane which in turn is externally coated with a translucid PVC coating. In particular, the polyurethane coating includes one or more UV filtering substances, as mentioned above, as e.g. that substances mentioned in WO 2010/075946 A1, namely in particular metal oxides, transition metal oxides, metal oxide hydrates, benzophenones, anthranilates, salicylates, dibenzoylmethane derivatives, p-aminobenzoic acid, derivatives, cinnamic acid derivatives (phenylcyanoacrylic derivatives), cyanoacrylates, benzimidazole derivatives, benzotriazole derivatives, beta-beta'-Divinylacrylate, alkyl-α-cyano-beta-beta'-divinylacrylate, 1,3,5-triazine compounds and sterically hindered amines, zinc oxide, 2-ethoxyethyl-p-methoxy cinnamate, diethanolamine p-methoxycinnamate, octyl-p-methoxycinnamate, 2-ethylhexyl-2-cyano-3,3-diphenylacrylate, Kaliumcinnamat, propyl 4-methoxy-cinnamate, amyl 4-methoxycinnamate, α-cyano-4-methoxycinnamic acid and the corresponding hexyl, cyclohexyl 4-methoxycinnamate, glyceryl p-amino benzoate, amyl p-dimethylaminobenzoate, ethyl 4-bis (hydroxypropyl)-aminobenzoate, octyl p-dimethylaminobenzoate, ethoxylated-4-aminobenzoic acid, octyl salicylate, Triethanolaminsalicylat, salts of salicylic acid, 4-isopropylbenzyl salicylate, 2-ethylhexyl 2-(4-phenylbenzoyl) benzoate, homomenthyl salicylate, 2-hydroxy-4-methoxybenzophenone, 2,4,6-trianilino-(p-carbo-2-ethylhexyloxy)-1,3,5-triazine, 2-phenylbenzimidazole-5-sulfonic acid, 1-(4-tert-Butylphenyl)-3-(4-methoxyphenyl) propan-1,3-dione, p-cumenyl-3-phenylpropan-1,3-dione, 1,3-bis (4-methoxyphenyl) propan-1,3-dione, menthyl anthranilate, Homomenthyl acetylanthranilat-N—, 2-hydroxy-4-octylbenzophenon, 6-tert-Butyl-2-(5-chloro-2H-benzotriazol-2-yl)-4-methylphenol, 2,4-di-te/t-butyl-6-(5-chloro-2H-benzotriazol-2-yl)-phenol, 2-(2H-benzotriazol-2-yl)-4,6-di-te/-pentylphenol?, 2-(2H-benzotriazol-2-yl)-4-(1,1,3,3-tetramethyl-butyl) phenol, 1,3-bis [(2'-cyano-3',3'-diphenylacryloyl) oxy]-2,2-bis-{[(2'-cyano-3',3'-diphenylacryloyl) oxy]methyl}-propane, 2-(2H-benzotriazol-2-yl)-4-methylphenol, 2-(2H-benzotriazol-2-yl)-4,6-bis (1-methyl-1-phenylethyl) phenol, ethyl 2-cyano-3,3-diphenylacrylate, (2-ethylhexyl)-2-cyano-3,3-diphenylacrylate, N,N'-bisformylbicyclo N,N'-bis-(2,2,6,6-tetramethyl-4-piperidinyl)-hexamethylenediamine, bis-(2,2,6,6-tetramethyl-4-piperidyl) sebacate, bis (1,2,2,6,6-pentamethyl-4-piperidyl) sebacate, methyl (1,2,2,6,6-pentamethyl-4-piperidyl) sebacate, butyl methoxydibenzoylmethane (Parsol 1789), Disodium phenyldibenzimidazoletetrasulfonate tetrasulfonate (Neo Heliopan AP), octocrylene (Neo Heliopan 303), ethylhexyl triazone (Uvinul T 150), Ethylhexyl Salicylate (Neo Heliopan OS) Phenylbenzimidazolesulphonic acid (Eusolex 232), Ethylhexyl Methoxycinnamate+BHT (Uvinul MC 80, homosalate (Eusolex HMS), benzophenone-3 and/or bis-ethylhexyloxyphenol methoxyphenyl triazine (Tinosorb S), 4-(dimethylamino) benzoic acid (2-ethylhexyl) ester (Uvinul A Plus), 3-(4-methylbenzylidene) camphor; ethylhexyl, 4-(dimethylamino) benzoic acid (2-ethylhexyl) ester, 4-(dimethylamino) benzoic acid amyl, 4-Methoxybenzalmalon acid di-(2-ethylhexyl) ester, 4-methoxycinnamic acid (2-ethylhexyl) ester, 4-methoxycinnamic acid, 2-hydroxy-4-methoxybenzophenone, 2-hydroxy-4-methoxy-4'-methylbenzophenone, 2,2'-dihydroxy-4-methoxybenzophenone, 2-(4'-diethylamino-2'-hydroxybenzoyl) benzoate, 4-(tert-butyl)-4'-methoxydibenzoylmethane; homomenthyl, 2-ethylhexyl 2-hydroxybenzoate, 2-ethylhexyl 2-cyano-3,3-diphenylacrylate; dimethicodiethylbenzalmalonate, 3-(4-(2,2-bisethoxycarbonylvinyl)phenoxy)propenyl) methoxysiloxan/dimethylsiloxane-copolymer; dioctylbutylamidotriazone (INCI: Diethylhexyl-Butamidotriazone), 2,4-bis [5-1(dimethylpropyl) benzoxazol-2-yl-(4-phenyl) imino]-6-(2-ethylhexyl) imino-1,3,5-triazine with the (CAS No. 288254-16-0), 4,4',4"-(1,3,5-triazine-2,4,6-triyltriimino)-tris-benzoic acid tris (2-ethylhexyl) (also: 2,4,6-tris [anilino (p-carbo-2'-ethyl-1'-hexyloxy)]-1,3,5-triazine (INCI: Ethylhexyl Triazone) 2,4-bis-{[4-(2-ethyl-hexyloxy)-2-hydroxy]phenyl}-6-(4-methoxyphenyl)-1,3,5-triazine (INCI: includes bis-ethylhexyloxyphenol methoxyphenyl triazine, merocyanine.

The invention claimed is:

1. An aerator device for introducing gas bubbles into a liquid comprising
   (a) a base member comprising a gas supply, a plurality of border strips, and a metallic clamping strip;
   (b) an elastic perforated membrane attached to the base member, and
   (c) a UV protecting cover member, wherein the UV protecting cover member or at least a part thereof is arranged above the membrane to protect the membrane against UV radiation during shipping and storage of the aerator device, wherein the UV protecting cover member comprises a flexible composite sheet, which comprises a polyurethane film at an outer side of the flexible composite sheet, the polyurethane film being in turn externally coated with translucent PVC, and wherein the UV aerator device comprises adhesive means for releasably attaching the UV protecting cover member to the base member, wherein the plurality of border strips extend peripherally around edges of the base member and sandwich the membrane with the membrane folded around the edges of the base member, wherein the metallic clamping strip fixes the plurality of border strips and membrane to the edges of the base member, and wherein the cover member covers an upper side of the aerator device and the membrane and partially covers the metallic clamping strip with edge portions of the cover member folded around the edges of the base member and with the cover member releasably fixed to bottom portions of the border strips with the adhesive means.

2. The aerator device according to claim 1, wherein the composite sheet comprises a woven fabric.

3. The aerator device according to claim 2, wherein the UV protecting cover member has a thickness of 0.3 to 0.6 mm.

4. The aerator device according to claim 2, wherein the woven fabric is arranged facing the membrane.

5. The aerator device according to claim 4, wherein the UV protecting cover member has a thickness of 0.3 to 0.6 mm.

6. The aerator device according to claim 1, wherein the UV protecting cover member has a thickness of 0.3 to 0.6 mm.

7. The aerator device according to claim 1, wherein the adhesive means releasably attaches the UV protecting cover member with the edge portions of the cover member wrapped around the edges of the base member and with a central portion of the cover member contacting a top of the gas supply.

8. An aerator device for introducing gas bubbles into a liquid, comprising:

(a) a base member comprising a gas supply, a plate, a plurality of web parts at respective edge portions of the base member, a plurality of hollow clamping members, and a plurality of front clamps, wherein each of the plurality of web parts has an upper portion defining a groove, and wherein respective grooves defined by the plurality of upper portions of the web parts are disposed adjacent respective sides of the plate;
(b) an elastic perforated membrane attached to the base member, and
(c) a UV protecting cover member, wherein the UV protecting cover member or at least a part thereof is arranged above the membrane to protect the membrane against UV radiation during shipping and storage of the aerator device, wherein the UV protecting cover member comprises a flexible composite sheet, which comprises a polyurethane film at an outer side of the flexible composite sheet, the polyurethane film being in turn externally coated with translucent PVC, wherein the UV aerator device comprises adhesive means for releasably attaching the UV protecting cover member to the base member, wherein the hollow clamping members clamp respective edges of the membrane into the respective grooves defined by the plurality of upper portions of the web parts, and wherein the cover member covers the membrane with portions of the cover member releasably attached to respective outside surfaces of the web parts and with a front part of the cover member fixed to the front clamps so as to leave the gas supply free.

9. The aerator device according to claim 8, wherein the composite sheet comprises a woven fabric.

10. The aerator device according to claim 9, wherein the UV protecting cover member has a thickness of 0.3 to 0.6 mm.

11. The aerator device according to claim 9, wherein the woven fabric is arranged facing the membrane.

12. The aerator device according to claim 11, wherein the UV protecting cover member has a thickness of 0.3 to 0.6 mm.

13. The aerator device according to claim 8, wherein the UV protecting cover member has a thickness of 0.3 to 0.6 mm.

* * * * *